United States Patent [19]

Bass et al.

[11] Patent Number: 4,649,233

[45] Date of Patent: Mar. 10, 1987

[54] METHOD FOR ESTABLISHING USER AUTHENICATION WITH COMPOSITE SESSION KEYS AMONG CRYPTOGRAPHICALLY COMMUNICATING NODES

[75] Inventors: Walter E. Bass, Sunnyvale, Calif.; Stephen M. Matyas, Kingston; Jonathan Oseas, Hurley, N.Y.

[73] Assignee: International Business Machines Corporation, Armonk, N.Y.

[21] Appl. No.: 722,091

[22] Filed: Apr. 11, 1985

[51] Int. Cl.⁴ .............................................. H04L 9/00
[52] U.S. Cl. ........................................ 380/21; 380/25
[58] Field of Search ............... 178/22.08, 22.09, 22.14; 340/825.34; 235/380, 382

[56] References Cited

U.S. PATENT DOCUMENTS 4,193,131 3/1980 Lennon et al. .................... 178/22.09
4,203,166 5/1980 Ehrsan et al. .................... 178/22.09
4,423,287 12/1983 Zeidler ............................. 178/22.08

Primary Examiner—Salvatore Cangialosi
Assistant Examiner—Aaron J. Lewis
Attorney, Agent, or Firm—R. Bruce Brodie; F. D. LaRiviere

[57] ABSTRACT

A method for authenticating nodes/users and in protecting data flow between nodes. This is facilitated by creating a dialogue involving authenticated encryption among the nodes. During each session, a key for use in cryptographic conversion is constructed among the node participants in order to permit symmetric authentication. The key is unique to the session. A different key is generated for each and every session. The building of the session key involves sharing of a minimal amount of information among the participants in the form of combining both a random number and authentication indicia.

16 Claims, 4 Drawing Figures

METHOD FOR ESTABLISHING USER AUTHENICATION WITH COMPOSITE SESSION KEYS AMONG CRYPTOGRAPHICALLY COMMUNICATING NODES

TECHNICAL FIELD

This invention relates to a method for establishing a key commutatively among cryptographically communicating nodes and for concurrently authenticating the node and user identities.

BACKGROUND

In the prior art, several references respectively illustrate protocols for forming composite keys among cryptographically communicating nodes. Further, they discuss authentication as a process independent of the establishment of session keys. These references include Ehrsam et al, U.S. Pat. No. 4,227,253, "Cryptographic Communication Security for Multiple Doman Networks", issued Oct. 7, 1980; Matyas et al, U.S. Pat. No. 4,218,738, "Method for Authenticating the Identity of a User of an Information System", issued Aug. 19, 1980; and Meyer and Matyas, "Cryptography—New Dimension in Computer Data Security", John Wiley & Sons, pp. 293-299, 343-347, and 679-683, 1982.

It is an aim of cryptography to transform plain text messages into ciphered text that can withstand intense cryptanalysis. Relatedly, encipherment and decipherment reference that set of one-to-one and onto transformations which respectively map a set of plain text strings into a set of cryptographic strings and vice versa. Alternatively, a feedback arrangement may be constructed upon a cryptographic transformation, yielding a pseudorandom bit stream generator, and the output of such a generator may be exclusively OR'ed with a clear text datastream to produce a ciphered datastream.

A key identifies the specific mapping function. Typically, the key used by a sending node in selecting the function for converting plain text to ciphered text would be the same as the key used by a receiving node in selecting the function for converting from ciphered text to plain text. Such is not a limitation but merely a convenience. Relatedly, each node would possess those keys of the other nodes from which ciphered traffic was to be expected.

One method for penetrating even a cryptographically secure system is to record the cryptographic traffic used to access a target node and subsequently inject the playback into a path to said target node. One defense is to secure the change of the encrypting/decrypting keys from session to session. Of course, such measures would not foil an unauthorized source in possession of the keys from accessing the target node. Thus, "authentication" may be considered to be a process which proves that someone or something is valid or genuine. Among the methods described by Meyer and Matyas is the use of a session key formed as a function of information independently furnished by each of the participating nodes. For example, if a pair of nodes exchanged encrypted random numbers and combined the received number with its locally generated number, they both could compute the same session key. Such a composite key would not permit key reconstruction by wiretap and playback of an encrypted random number in the designated node at a later time.

The Ehrsam patent describes and claims one form of session key protocol in which an intermediate encryption mechanism (cross-domain keys) is used for exchanging session key information between nodes on one hand and protecting the identity of the node master keys on the other. The Matyas patent involves a node sending a pattern to a terminal requiring the terminal to modify the pattern and remit its modification back to the host to permit a comparison match.

THE INVENTION

It is an object of this invention to devise a method for establishing a common session key among nodes and users to a cryptographic communications session. It is a related object that such method concurrently authenticate the session participants such that the matching session keys will be generated only if all of the participants are authenticated. It is yet another object that the method should cover communications among nodes in the conference calling context. That is, the symmetry or commutivity of the cryptographic session key is not to be affected by the directionality of the conference calling net.

The foregoing objects are satisfied by a method for establishing a key commutatively between a pair of cryptographically communicating nodes and for authenticating the node/user identities. The key is valid only for the duration of a single cryptographic session. In this regard, each node possesses a local cryptographic facility including a pre-established cross-domain key, a node/user identity, and indicia as to the identity of the other node or nodes. The method steps at each node comprise (a) generating a random number and encrypting said random number under the cross-domain key, copying said encrypted number to the other node, and decrypting under the cross-domain key any received encrypted random number from said other node; (b) forming a parameter by combining the attributes derived or associated with the identities of both nodes/users; (c) forming an interim key from the composite of the local and received random numbers; and (d) encrypting the parameter with the interim key to produce the session key.

It should be observed that in steps (c) and (d), the session key generation is combined with that of authentication.

As articulated, the invention reduces vulnerability to both playback and password attack. Playback attacks are prevented by the fact that a new session key is established for each session and the session key depends upon secret random numbers supplied by each node for each separate session. Password vulnerability is reduced by ensuring that passwords are combined into a complex function involving secret time-variant random numbers, thus eliminating the possibility that password values could be deduced by tapping communication lines and accumulating encrypted values communicated from one node to another—no encrypted passwords are transmitted among the nodes. User authentication is implicit and not explicit. That is, passwords are not exchanged and compared with similar password reference values stored in a data base as is the usual method of password authentication.

The method of this invention advances the art provided by the aforementioned Ehrsam patent. Whereas Ehrsam describes a communication security system providing for the establishment of a session key and the concept of cross-domain keys, he does not teach symmetric key formation as a function of random information generated at each node combined with the local node/user identity or derivative thereof. Indeed, Ehrsam typifies the prior art by requiring asymmetrical relations in order to establish session keys. An example of asymmetrical relations would be where one node serves as a master with a second node serving as a slave. In such a system, the session key would be generated at the master node and sent to the slave node. Lastly, note that the aforementioned Meyer and Matyas references do not teach combining authentication with session key communications.

DESCRIPTION OF THE PREFERRED EMBODIMENT AND INDUSTRIAL APPLICABILITY

It should be appreciated that, where a secure data path may be desired between two nodes, only nonsecure interconnecting lines such as a public telephone network may be available. Although the nodes may be geographically dispersed, each may comprise a cluster of stored program control data processing and communication facilities. A representative functional menu may be seen, for example, in FIG. 1 of Matyas, U.S. Pat. No. 4,218,738.

Embedded in each node is a security module. It is placed in the data path in each node at the point where the nodes interface to the nonsecure interconnecting paths. The security module encrypts and decrypts data such that only encrypted data is transmitted over the nonsecure facilities once a session between the nodes has been established. In subsequent paragraphs, there will be described a preferred implementation of the method of this invention for establishing a unique session key commutatively between a pair of the communicating nodes and for simultaneously allowing each node to authenticate the identity of the other node, including the option of allowing each node to authenticate the identity of the user at that node.

The Physical Environment

Figure 1:
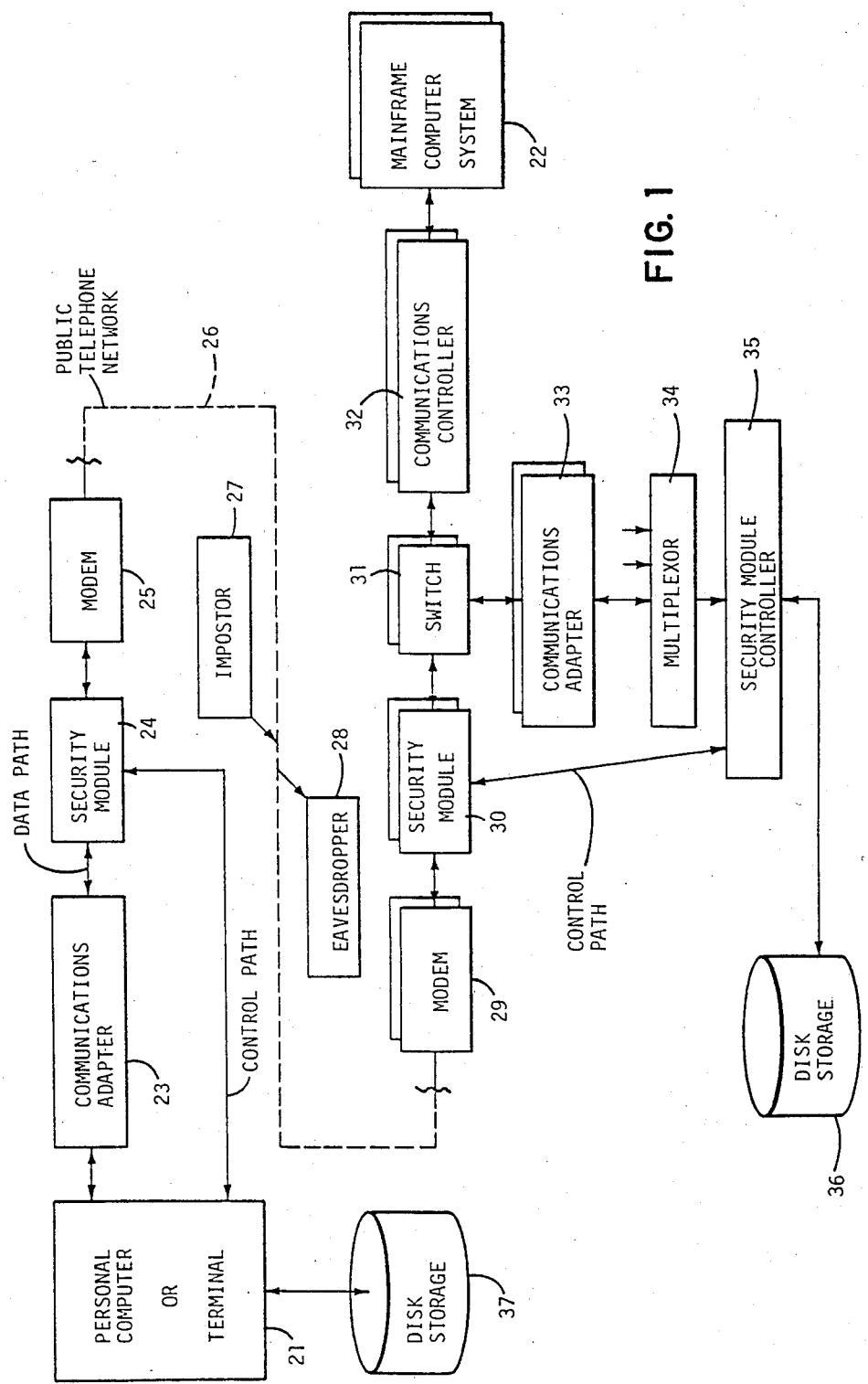
FIG. 1 is a block diagram depicting a pair of nodes in a cryptographically communicating relationship emphasizing the security module position.

Referring now to FIG. 1, there is shown a personal computer or terminal 21 with attached storage 37 desiring to communicate with a remote node 22. In this case, node 22 may be in the form of a mainframe computing system. A file, either disk or buffer stored and subject to a transmission or send protocol at node 21, is passed to communications adapter 23 for converting byte serial data to a bit serial datastream. The data passes through security module 24 and is encrypted in the process. From here, the data passes through modem 25, over the public switched network 26.

At this point, the data is subject to eavesdroppers 28. Subsequently, the data passes through the modem 29 at the remote node. It then courses through a second security module 30. The security module 30 descrypts the datastream and the decrypted data is, in turn, put through switch 31 and then through a communications controller 32. The controller 32 converts the data from bit serial format to some other, presumably byte serial format, which can be processed by the mainframe computer system 22, incidentally resident at this node. In a similar manner, data originating at the node, including mainframe computing system 22, sends data to the remote node, in this case, personal computer 21, using the same process but in the other direction. This is standard practice in the art. However, in order for the security modules 24 and 30 to encrypt and decrypt data in a manner where it is not available to eavesdroppers, a secret key must be generated and disclosed to both security modules in some way such that the secret key cannot be known by an eavesdropper 28 who perhaps was listening at a tap at the telephone network 26. Additionally, the method used in generating the secret key should be such that an impostor 27, who has access to the telephone network, cannot successfully impersonate either the terminal 21 or the mainframe computer system 22.

Some number of methods have been devised to generate such a secret key, but the methods differ in the overall level of achievable security. In the preferred embodiment, the encryption/decryption algorithm used in the security module is the Data Encryption Standard (DES) set in the cipher feedback mode. This algorithm standard was first published by the U.S. National Bureau of Standards in FIPS PUB 46 in January 1977. The cipher feedback mode of operation is described in U.S. National Bureau of Standards FIPS PUB 81, Dec. 2, 1980. Relatedly, also see the description by Denning, "Cryptography and Data Security", Addison-Wesley Publishing Co., pp. 92–102, 1982.

Figure 2:
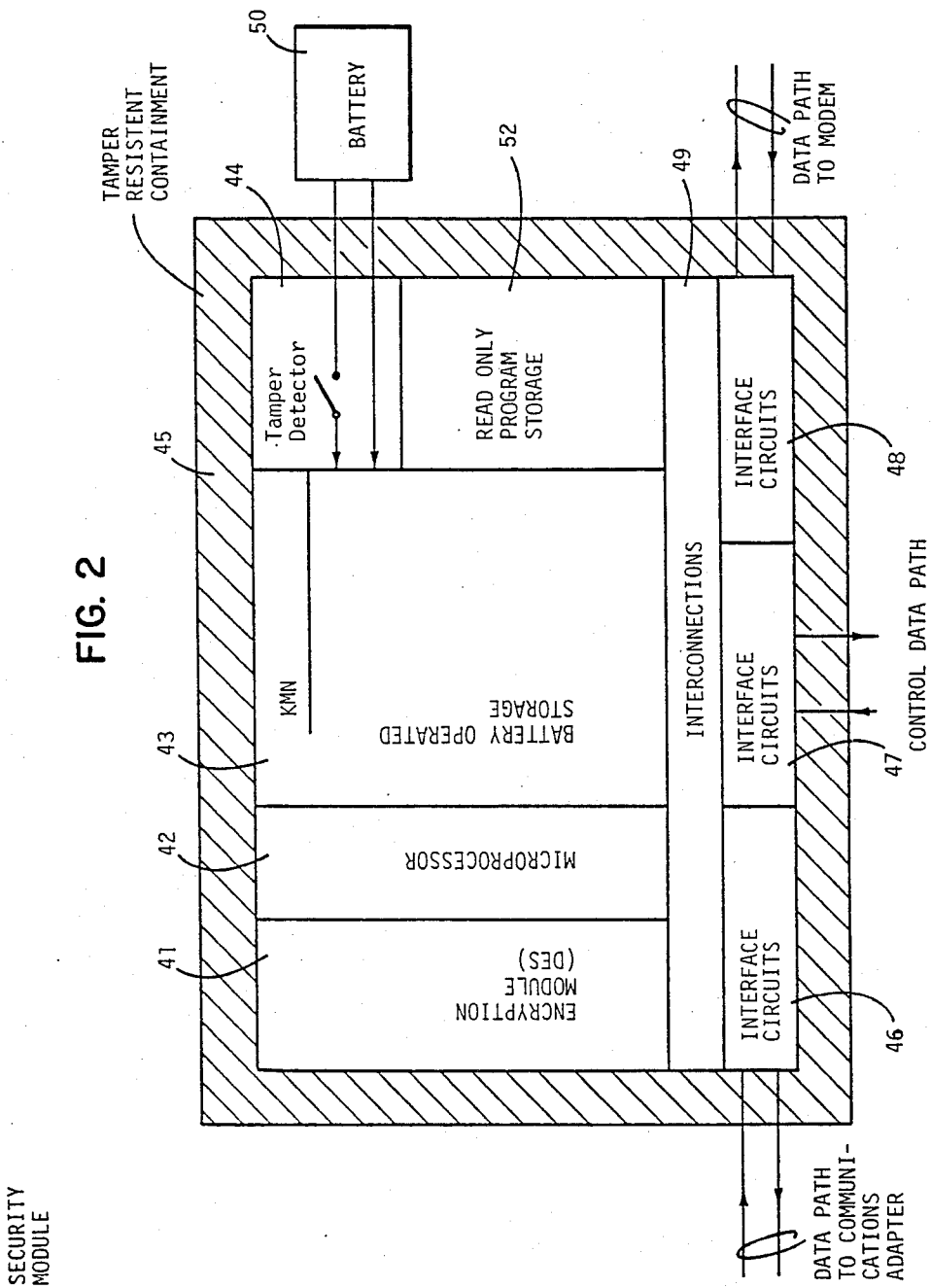
FIG. 2 shows the constituent elements of said security module.

Referring now to FIG. 2, there is shown the security module appearing as elements 24 and 30 in FIG. 1. The security module is installed so that data passes through a security module at each end of the communications link. There are several functions in addition to encryption and decryption of a datastream which are performed by the module. For example, there is included battery-maintained store 43, implementable, for example, in CMOS. Store 43 is capable of retaining a certain amount of information, among which is the node master key (KMN). The security module is arranged such that KMN is destroyed in case penetration is made of said module. Thus, critical elements are protected by a tamper-resistant container 45 and a tamper detector 44. At a minimum, tamper detector 44 would disconnect the battery 50 from the store 51 in the event that a penetration attempt was made.

The security module includes the interface circuits 46, 47, and 48 respectively coupling the data path to the communications adapter 23, a control path to a node, and a data path to modem 25. This security module would further include a necessary microprocessor 42 and an encryption module containing the DES algorithm 41.

Figure 3:
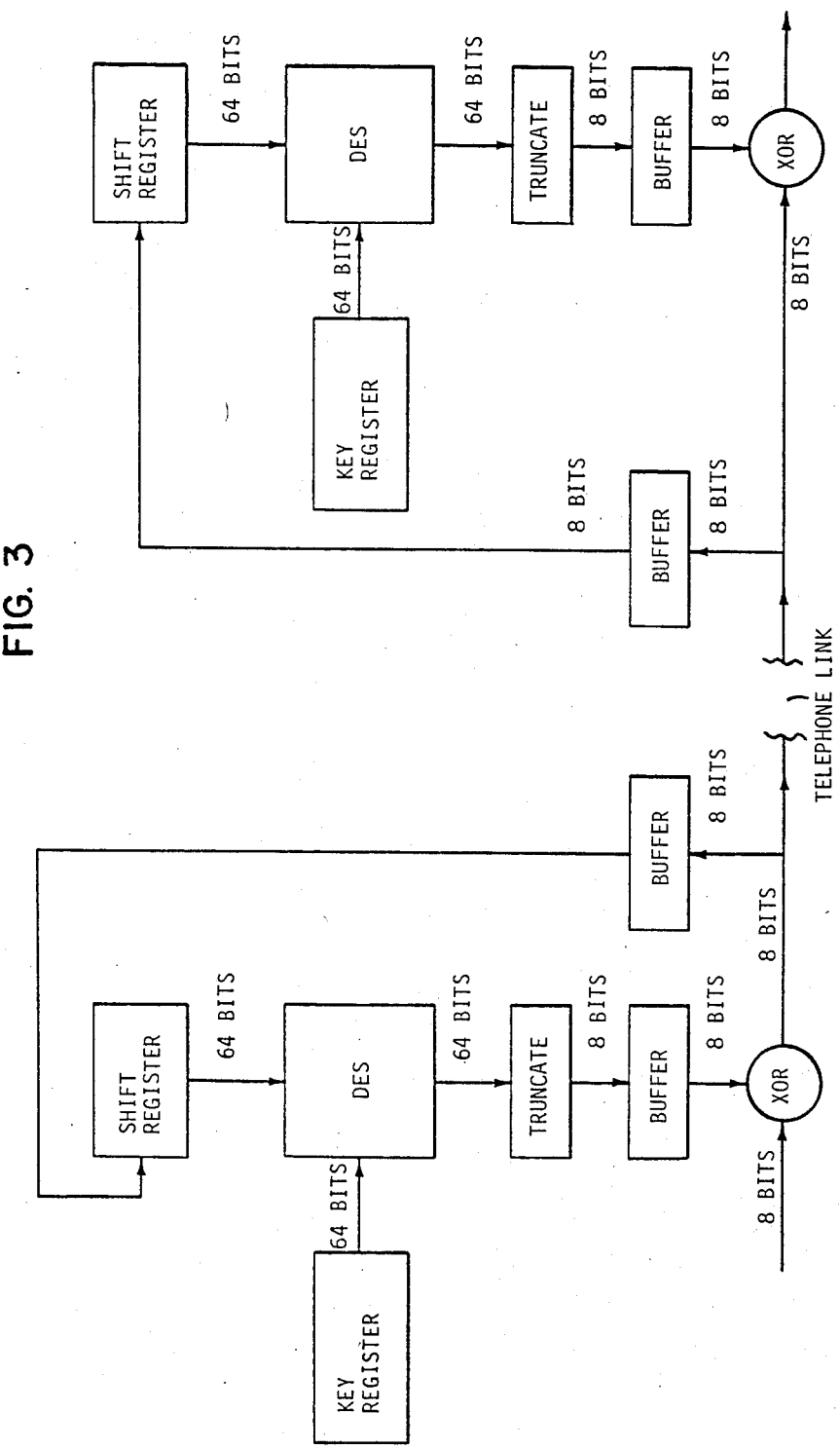
FIG. 3 exhibits the data flow for encryption and decryption within the security module.

Referring now to FIG. 3, there is shown the data flow for encryption and decryption within the security module. Note, the DES chip transforms shifted data under control of the contents of the key register for both encryption and decryption purposes. This process is well documented, the details of which may be found in the aforementioned National Bureau of Standards reference.

Having described aspects of a physical system upon which the method of this invention may be practiced, attention is now directed to a description of the logical facilities.

A Logical View of the Security Module

A previously mentioned, each security module has a tamper-resistant area. This is also termed the cryptographic facility (CF). Sensitive information is included within the battery-supported RAM such that in any attempt to extract it, it will cause the RAM contents to be lost. Significantly, the RAM contains a master key, denoted by *KMN. This key is used as a key encrypting key by protecting other keys and data stored outside the facility. *KMN consists of two 64-bit DES keys, KMN and IMN. The encryption of a 64-bit value X under *KMN is defined as encryption of X with KMN, decryption of the result with IMN, and encryption of that result with KMN. That is, $$E*_{KMN}(X) = E_{KMN}D_{IMN}E_{KMN}(X).$$

Decryption of X under *KMN is defined as decryption of X with KMN, encryption of the result with IMN, and decryption of that result with KMN. That is, $$D*_{KMN}(X) = D_{KMN}E_{IMN}D_{KMN}(X).$$

Before a specific pair of nodes can communicate, a cross-domain key, designated *KNC, must be generated and installed at both nodes. *KNC also consists of two 64-bit DES keys, KNC and INC. Encruption and decryption under *KNC is defined in the same way as previously defined for *KMN. A cross-domain key is a key used to encrypt and transmit secret random numbers from one node to another in a network, or from one domain of one node to the domain of another node in the network. For purposes of this invention, the "domain" of a node refers to the set of resources managed by the node. Data communications involving only a single node are referred to as single domain communications, whereas those involving more than one node are referred to as multiple domain communications.

The cross-domain keys, installed at each node, are actually variants of one another. More particularly, for a pair of nodes x and y that desire to communicate, *KNC is installed at one of the nodes, say node x, and the first variant of *KNC is installed at the other node, node y. The notation *KNC0 will be used instead of *KNC. *KNC1 will therefore designate the first variant of *KNC0. *KNC1 consists of two 64-bit keys, KNC1 and INC1, where KNC1 = KNC0 *hex '8888888888888888'
2ti INC1 = INC0 *hex '8888888888888888'

* denotes the exclusive OR;
hex = hexadecimal format.

Each cross-domain key shared with another node is stored either in the CF in the protected memory portion of security modules 24 and 30, or outside the CF in encrypted form under encryption of the master key or variant of the master key. Use of the cross-domain key is such that when a communications session is established, each node can verify that it is communicating with an authentic other node of the pair rather than an impostor. This is referred to as node authentication, or terminal authentication, when the node being verified happens to be a terminal.

When authentication is required for users at node x in the node x-to-node y session, a user password authentication value (PWF) must be installed at node y for each valid user ID and password (PW) allowed at node x. Similar to cross-domain keys, password authentication values are available for user authentication. However, password values themselves are not extractable from these password authentication values. Password values entered into the password authentication process may be from 1 to 80 characters or bytes in length. Whenever necessary, passwords may be padded to the right with blanks to make every password 80 characters or bytes in length. The password is then encrypted with the DES using a cipher block-chaining mode of encryption with a key and initialization vector of all zero bits. The hashed password, denoted KPW, is obtained by taking the rightmost 56 bits from the last block of produced ciphered text, and expanding these 56 bits to 64 bits by adding an 8th parity bit for each 7 bits in the 56-bit key. The parity bit is added on the righthand side such that, from left to right, the resulting key consists of 7 key bits, 1 parity bit, 7 key bits, 1 parity bit, etc. This result is designated as KPW.

The password authentication values may be determined from KPW and the user ID (UID) by way of the relation $$PWF = [D_{KPW}(UID)]*UID.$$

Ordinarily, if a password authentication value is installed at node x for the user having the ID A, that same password is utilized by user A when establishing a path to x, irrespective of the node where A currently resides. Node x has a list of cross-domain keys. That is, it has one key for each node authorized to communicate with x. Also, node x has a list of authorized user ID's and associated password authentication values. There is one value for each user authorized to communicate with x. A node does not normally store more than one password authentication value per user ID, even if that user ID can "talk" with that node by way of several different nodes. It is appreciated that procedures for installing cross-domain keys and password authentication values at each node are well known to the art.

Establishing Session Keys

Although the following example references two-node interconnection, the method of session key generation contemplates any number of nodes participating. Thus, irrespective of the number of nodes involved, all nodes should generate the same session key. The session key is defined by $$KS = E_{[R_1*R_2*R_3*R_4...]}(PWF_1 + PWF_2 + PWF_3 + PWF_4 + ...)$$

where + is addition modulo $2^{64}$ and where $R_1*R_2*R_3*R_4$ represents a set of secret random numbers contributed by counterpart nodes. The fact that each node contributes its own random number in generating session keys ensures that session key generation scenarios cannot be "faked" by impostor nodes. This arises where the impostor nodes merely replay recordings of a previous key generation scenario.

The $R_n$ values are exchanged over the network just prior to the generation of the session key. In this regard, each node obtains a secret random number from each other node. Illustratively, suppose that there were only two nodes involved, x and y, and *KNC0 is stored at x and *KNC1 is stored at y. A random number $R_x$ is encrypted at x under the first variant of the cross-domain key stored at x, i.e. *KNC1, and sent to y. At node y, the received encrypted $R_x$ is decrypted under the cross-domain key stored at y, *KNC1, since no variant of the key is first calculated. Similarly, a random number $R_y$ is encrypted at y under the first variant of the cross-domain key stored at y, that is, *KNC0, and sent to x. At node x, the received encrypted $R_y$ is decrypted under the cross-domain key stored at x, *KNC0, since no variant of the key is first calculated. The distribution method ensures that certain playback attacks will not weaken the security of the generated KS value, since the key under which an R value is sent from one node to another is never the key which receives an R value from that other node.

It is appreciated that the same goal could be achieved with two independent keys instead of variants of the same key.

During the protocol which perceived the setting of the session key, user ID's should be exchanged so that the user at each node is identified. Encrypted $PWF_n$ values are obtained from a password authentication value table based upon the user ID's of the remote users to be involved in the session. For example, suppose that user A is located at node x. At node x, $PWF_A$ is calculated in the CF from user A's entered password and user ID. The calculated $PWF_A$ is automatically "folded" into the $PWF_n$ summation at x. At all other nodes, user A's ID is used to retrieve $PWF_A$ from the counterpart password authentication value table. $PWF_A$ is then automatically "folded" into the PWF summation. Similarly, the PWF value for each user at each other node becomes a term in the $PWF_n$ summation. Since both the "*" and the "+" operations are commutative, the method steps of this invention cause each node to generate the same session key value provided, of course, the correct values are entered and used at each node.

If three or more nodes and users are involved, each user must install the same PWF value at each of the other $n-1$ nodes for which an n-way connection and encrypted session is desired. When only two nodes and users are involved, unique PWF values can be stored and used for authentication.

For each node, the "last term" of both the $R_n$ and $PWF_n$ summations represents the random number value and user ID/password values of the local node. Also, for $n \geq 2$, a unique cross-domain pair is shared for each pair of nodes. Consequently, a compromise of one node does not operate to compromise the entire system.

In the ensuing description, there is first set out a set of temporal and spatial definitions used in the example of the method of this invention. In this regard, the principal actions of the method are distributed over a time-line. These actions are symmetric such that each node mirrors the activity at the other node. The acronym references are defined in the ensuing paragraphs to furnish both a consistent and unambiguous description.

Cryptographic Facility (CF) Primitives

In order to illustrate the use of the invention, a set of primitives (e.g. a command set) for the Cryptographic Facility is defined, and then the session initiation protocol in terms of those primitives is illustrated.

In the design of a CF command set, one typically has a goal which is diametrically opposed to the normal goals of command set design. Namely, a major goal of the command set design is to limit what the user can do with the command set, whereas the more common goal is to maximize what the user can do with the command set. As a result, many of the commands perform multiple functions, and commands which perform the most basic operations possible are not available.

Figure 4:
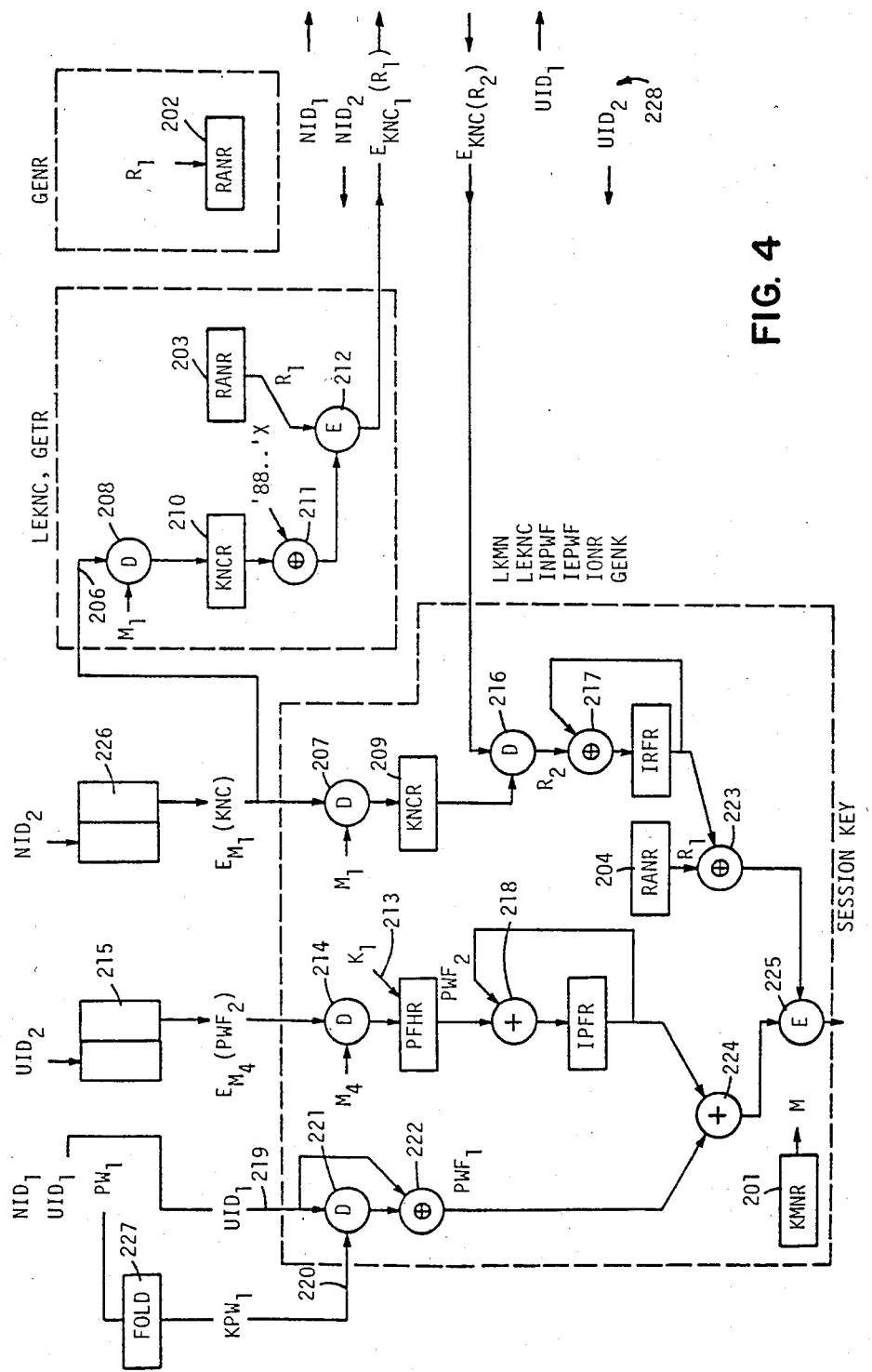
FIG. 4 details the formation of the session key and authentication method steps.

The CF primitives may best be visualized with the aid of FIG. 4. In FIG. 4, the areas with the dashed boxes represent data flow within the Cryptographic Facility. Values appearing within the dashed boxes are not available outside of the CF, either to the owner of the node, or to an intruder who might have obtained temporary use of the CF in some manner. Although three dashed areas are shown, these are all within one CF. The different dashed areas pertain to three data manipulation sequences, each of which produces an output of some kind. Some facilities (RANR, KNCR) are shown more than once so that their use can be shown in each of the data manipulations, but the multiple illustrations of these facilities actually represent the same physical facility.

Any of the encryption/decryption operations described below might have argument sizes of either 8 bytes or 16 bytes, and might utilize a key size of either 8 bytes or 16 bytes, (including key parity bits). When the key size is 16 bytes, it is understood that three passes are made through the DES algorithm. The keys used for these three passes are the first 8, last 8, and first 8 bytes, respectively, of the 16-byte key. The operations used in the three passes are 8-byte-key encryption, decryption, and encryption, respectively, when 16-byte-key encryption is specified; or 8-byte-key decryption, encryption, and decryption, respectively, when 16-byte-key decryption is specified. If the argument size is 16 bytes, then the first 8 bytes and then the second 8 bytes are encrypted on successive operations. Throughout, there is no particular logical difference between the use of 16-byte or 8-byte keys, except that greater security is obtained when the longer values are used.

In the current design, the node master keys and cross-domain keys are 16 bytes. The random numbers, password authentication functions, and session keys are 8 bytes.

The following is a list of primitives and their defined function:

LKMN—Load node master key.

A master key is accepted and placed in master key register KMNR (201 in FIG. 4).

LKMN is not actually used during a session, but is required to initialize a CF with a master key before the CF can be placed into use.

GENR—Generate a random number.

GENR is normally the first primitive which is used in preparation for generating a session key. It clears some accumulators in the CF and does the first step in the session key generation dialog, which is to generate the random number which will be contributed by this node.

A pseudo-random number is generated and placed in the RANR register. The DES chip is used in generating this random number, and battery-backed registers exist in the CF in support of the random number generation function. However, generation of pseudo-random numbers with the aid of the DES algorithm (or other algorithms) is common, and need not be described in more detail here. The random number is now available at points 202, 203, and 204 in FIG. 4. The important properties of this number are that its value cannot be predicted by an outsider, and that no one can force the CF to generate random numbers which match those which were utilized in previous sessions.

GENR also causes the IPFR and IRFR registers to be cleared to zeroes.

The GENR primitives include a 1-second pause to limit the rate at which certain exhaustive attacks can be attempted when an intruder has gained physical access to a CF.

LEKNC—Load external cross-domain key.

An argument is accepted (at 205/206) which is subsequently decrypted under the first variant of the master key (which comes from KMNR, at 201). The decryption is depicted at 207 and 208. The decrypted value is held in the KNCR register, shown at 209/210.

GETR—Get random number.

The random number value generated by GENR is encrypted under the first variant of the cross-domain key currently held in KNCR, and the result is returned to the user. This is depicted at 211 (taking the variant) and 212 (encrypting) in FIG. 4.

INPWF—Input Null Password Function value.

The value zero is decrypted with a key of zero, and the result is placed in the PFHR register. Since zero decrypted by zero is a constant, this may alternatively be accomplished by loading PFHR with that constant. This is depicted at 213 in FIG. 4.

When communicating with nodes which have no user to be authenticated, such as an unattended mainframe computer, the "user ID" and "user password" for that node are implicitly understood to be zeroes. The INPWF primitive allows for the handling of this case, without requiring a protocol which is conceptually different.

IEPWF—Input External Password Function.

An argument value is accepted and decrypted under the fourth variant of the master key (obtained from KMNR, at 201), and the result is placed in the PFHR register. This is depicted at 214 in FIG. 4.

(The fourth variant is utilized here, rather than second or third, in an effort to be compatible with existing usages of the various variants of a master key. That is, the first through third variants are already used for various specific purposes in existing products, but the fourth variant has no such constraint. However, there is no logical significance to which variant is used, other than the fact that the variant chosen here be a different variant than the one chosen for use in the LEKNC primitive.)

The value which would be inputted to this primitive would normally be obtained from a user authentication table, depicted as 215 in FIG. 4. The UID is used to access the authentication table as received from the other node. That is, 215 is a table of users and encrypted password authentication values. After a normal, correct usage of IEPWF, the correct Password Authentication Value (PWF) for the specified user would normally reside in the PFHR register, depicted as 213 in FIG. 4, after the execution of the IEPWF primitive. Note that the unencrypted PWF value is not made available outside of the CF.

IONR—Input other node random number data.

An argument value is accepted and decrypted under the current cross-domain key (in KNCR). That result in modulo 2 summed by bit (exclusive OR'ed) into the IRFR register. This is depicted at 216 and 217 in FIG. 4. Also, the current value of the PFHR register is summed into IPFR. This is depicted at 218 in FIG. 4.

INPWF or IEPWF must be executed prior to the IONR operation, so that PFHR contains a Password Authentication Value (PWF) for a user at some other node when this operation is executed.

Note that the INPWF and IEPWF primitives merely load a Password Authentication Value (PWF) into a buffer or "holding" register (PFHR), rather than summing the value directly into the IPFR register. The actual summing of the PWF values is accomplished as part of the IONR primitive at the same time that the random numbers from the various nodes are summed. This arrangement ensures that the same number terms are entered into the PWF summation as are entered into the random number summation. This constraint makes certain types of attacks more difficult.

Note also that IPFR and IRFR are cleared when GENR is executed (GENR is normally the first operation in the sequence of establishing a session key). In the case of a connection between only two nodes, IONR is executed only once following the GENR, so the operations at 217 and 218 could have been simple copy operations rather than summing operations. However, in the case of a session involving three or more nodes, IONR is executed once by each node for each other node to be involved in the session, so the summing functions at 217 and 218 become significant.

GENK—Generate session key.

GENK completes the rest of the session key calculation. It accepts a user ID (at 219) and folded password (KPW) (at 220), decrypts the user ID with the folded password (at 221) and exclusive OR's the result with the user ID (at 222). This yields the Password Authentication Value (PWF) for the user at this node. GENK obtains the locally generated random number from the RANR register and exclusive OR's it with the value in IRFR (at 223). It also takes the PWF value from 222 and adds it to the value from IPFR (at 224). The result from 223 is used as a key to encrypt the value from 224, and this is the session key.

GENK also resets the RANR random number register 202, 203, and 204. After the RANR register has been reset, any operation which attempts to use the RANR register value will fail, until such time as a new random number is generated with the GENR primitive. This helps prevent an attacker from generating the last used session key at a node, should the impostor gain use of the CF at some time after the session has been completed.

For a session between only two nodes, IPFR would contain the Password Authentication Value (PWF) associated with the user at the other node, and IRFR would contain the random number generated by the other node at the time that GENR was executed. The other inputs to 224 and 223 are the PWF associated with the user at this node and random number for this node. By symmetry, the other node has the same input values to blocks 224 and 223 as exist at this node (in a valid session initiation), except that the inputs are reversed. Since the operations done by blocks 224 and 223 are commutative, the nodes will generate matching session keys.

Impostors and eavesdroppers using other nodes will fail because they do not have access to the correct cross-domain key to be used in exchanging random numbers, and their inputs at block 217 will be incorrect. Impostors not in possession of a valid user ID/password combination will fail even when using a valid node because the PWF presented to left-hand input to block 224 at the impostor's node will not match the right-hand input to the 224 block at the other node, as is required if matching session keys are to be generated.

Session Protocol Example

This example assumes that user "U1" at a terminal node "N1" wishes to communicate with a mainframe node "N2". There is no specific user at the mainframe node. The cryptographic subsystem at the mainframe serves as a "gateway" to the mainframe system, and is referred to in the example as the "gateway". Further, node "N1" will be referred to as the "terminal".

Figure references in this description are to FIG. 4.

It is assumed that unique master keys have previously been installed at the terminal and the gateway, and that correct entries have been inserted into the user table 215 and node table 226 at the gateway, and into the node table 226 at the terminal. To discuss the session key initiation protocol, it is assumed that the cross-domain key at the terminal for this link has a value of hex '1111111111111111111111111111111'.

Sequence of events:

| Node N1 | Node N2 |
|---|---|
| The user invokes the session initiation program, identifies himself as U1, and indicates that he wishes to communicate with node N2. The program prompts the user for his password, and obtains the identity of the terminal node, "N1" from a file stored at the terminal. In terms of FIG. 4, the quantities indicated as $NID_1$, $UID_1$, and $PW_1$ are now known. | |
| The program folds the password (at 227) using the cipher block chaining algorithm described earlier, thus computing the value $KPW_1$. The program places a telephone call to node N2 based on a telephone number provided either by the user U1, or based on a directory and the desired other node identity "N2". | |
| | Node N2 answers the phone, thus providing a communications path. |
| Node N1 sends its node ID ("N1") and its user ID ("U1") to node N2. This is depicted in the column of transactions 228 listed at the right edge of FIG. 4. | |
| | Node N2 sends its node ID ("N2") and a user ID of binary zeroes to node N1. Since there is no user at the gateway to be authenticated, a user ID of binary zeroes is utilized. |
| Node N1 receives the node ID "N2" of the gateway and the user ID of binary zeroes from the gateway. This is depicted in the column of transactions 228 listed at the right edge of FIG. 4. Node N1 now has the following values:<br>$NID_1$ = "N1"<br>$UID_1$ = "U1"<br>$KPW_1$ = folded password for user U1<br>$NID_2$ = "N2"<br>$UID_2$ = binary zeroes. | |
| | Node N2 receives the node ID "N1" of the terminal and the user ID "U1" of the terminal user from the terminal. Node N2 now has the following values:<br>$NID_1$ = "N2"<br>$UID_1$ = binary zeroes<br>$KPW_1$ = binary zeroes<br>$NID_2$ = "N1"<br>$UID_2$ = "U1"<br>Note that $NID_1$, $UID_1$, etc. refer to the values for the local node, whereas $NID_2$, $UID_2$ refer to the values for the remote node. Hence, the above values of these quantities are as viewed at the CF at the gateway. |
| The terminal executes the GENR primitive, thus generating a random number in the RANR register 202, 203, and 204. The terminal also looks up the gateway node ID "N2" in the node table 226, obtains a corresponding value, and passes this value to the LEKNC primitive. This produces a cross-domain key value (hex '111 . . . 1' in this case) in the KNCR register (209 and 210). The terminal executes a GETR primitive which returns the random number from the RANR register, as encrypted by a key of hex '999 . . . 9'. The hex '999 . . . 9' key is the first variant of the hex '111 . . . 1' key and is generated at 211, with the encryption of the random number being done at 212. This encrypted value of the random number is sent to the gateway, as indicated in the transactions 228. | |
| | The gateway executes the GENR primitive, thus generating a random number in the RANR register 202, 203, and 204. The gateway also looks up the terminal node ID "N1" in the node table 226, obtains a corresponding value, and passes this value to the LEKNC primitive. This produces a cross-domain key value (hex '999 . . . 9' in this case) in the KNCR register (209 and 210). The gateway executes a GETR primitive which returns the random number from the RANR register, as encrypted by a key of hex '111 . . . 1'. The hex '111 . . . 1' key is the first variant of the hex '999 . . . 9' key and is generated at 211, with the encryption of the random number being done at 212. This encrypted value of the random number is sent to the terminal, as indicated in the transactions list 228.<br>Note that the "cross-domain key" held by the gateway does NOT match the "cross-domain key" held by the terminal. The key held by the gateway is the first variant of the key held by the terminal and, therefore, the key held by the terminal is the first variant of the key held by the gateway. When used as prescribed here, this arrangement does allow for a correct exchange of the random |

| Node N1 | Node N2 |
|---|---|
| | numbers generated at each node. The gateway looks up the user ID of the terminal user ("U1") in his user table 215 and obtains a corresponding value. This gateway executes the IEPWF primitive with this value as input, thus yielding the Password Authentication Value (PWF) associated with user U1 in the PFHR register. The gateway receives the encrypted random number passed from the terminal and uses it as input in executing the IONR primitive. The random number generated by the terminal thus is placed in the IRFR register at the gateway, after being decrypted at 216 and exclusive OR'ed with the previous contents of IRFR, which are zero (set by GENR) in this case. Similarly, as part of the IONR primitive, the Password Authentication Value (PWF) for user U1 moves from the PFHR register to the IPFR register, after being added to a value of binary zeroes at 218. The gateway executes the GENK primitive, providing a KPW argument of binary zeroes 220 and a UID argument of binary zeroes 219. This UID is decrypted 221 using the KPW value as a key, and the result is exclusive OR'ed with the UID 222. At 224, Password Authentication Values (PWF's) for the gateway (based on UID and KPW values of zero) and user U1 (based on UID "U1" and U1's password, but previously computed and encrypted under the fourth variant of the gateway's master key and placed in the user table 215 at the gateway) are added together. At 223, the random number generated at the gateway 204 is exclusive OR'ed to the random number generated by the terminal, which is now held in the IRFR register. The results calculation at 223 is used at 225 as a key to encrypt the results of the calculation at 224, thus yielding a session key which is returned as a result for the GENK primitive. |
| The terminal observes that the user ID passed by the gateway is binary zeroes. Based on locally held information associated with the node ID "N2", the terminal validates that "N2" is a "gateway" type of node, thus indicating that there is no user at the gateway to be validated, therefore indicating that binary zeroes are acceptable values for UID and KPW at the gateway. The terminal executes the INPWF primitive, thus placing a Password Authentication Value (PWF) associated with a user ID (UID) and folded | |

| Node N1 | Node N2 |
|---|---|
| password (KPW) values of binary zero into the PFHR register. The terminal receives the encrypted random number passed from the gateway and uses it as input in executing the IONR primitive. The random number generated by the gateway thus is placed in the IRFR register at the terminal, after being decrypted at 216 and exclusive OR'ed with the previous contents of IRFR, which are zero (set by GENR) in this case. Similarly, as part of the IONR primitive, the Password Authentication Value (PWF) for a user ID and KPW value of binary zeroes U1 move from the PFHR register to the IPFR register, after being added to a value of binary zeroes at 218. The terminal executes the GENK primitive, providing the KPW value previously computed by folding the U1's password at 220, and a UID value of "U1" at 219. This UID is decrypted 221 using the KPW value as a key, and the result is exclusive OR'ed with the UID 222. At 224, a Password Authentication Value (PWF) for the terminal (based on UID "U1" and a KPW value obtained by folding the user password) and a Password Authentication Value for the gateway (based on UID and KPW values of zeroes, previously entered at 213 via the INPWF primitive) are added together. At 223, the random number generated at the terminal 204 is exclusive OR'ed to the random number generated by the gateway, which is now held in the IRFR register. The result of the calculation at 223 is used at 225 as a key to encrypt the result of the calculation at 224, thus yielding a session key which is returned as a result for the GENK primitive. | |
| At this point, the terminal and the gateway have generated matching session keys. Both the terminal and the gateway enter encrypted communications mode and pass some test patterns across the link as a test that the session keys do indeed match. If they do, then the node and user at the terminal have been authenticated to the gateway, and the gateway node has been authenticated to the terminal. | |

While the invention has been particularly shown and described with reference to a preferred embodiment hereof, it will be understood by those skilled in the art that several changes in form and detail may be made without departing from the spirit or scope of the invention.

Having thus described the invention, what is claimed as new and is desired to secure by Letters Patent is:

1. A method for establishing a key commutatively between a pair of communicating nodes and for authenticating the node and user identities, said key being valid only for the duration of a single cryptographic session, each node of the pair having a local cryptographic facility including a pre-established cross-domain key and an identifier associated with the other node and user identity, comprising the steps at each node of:

(a) generating a local random number, encrypting said random number under the cross-domain key, transmitting said encrypted random number to the other node, and decrypting under the cross-domain key an encrypted random number received from said other node;

(b) forming a parameter by combining the attributes derived or associated with the identities of both nodes and users;

(c) forming an interim key from the composite of the local random and received encrypted random numbers; and (d) combining the parameter with the interim key to produce the session key.

2. A method according to claim 1, wherein the cross-domain key includes a local and remote variant, all unidirectional keys being dissimilar.

3. A method according to claim 1, wherein the identifier associated with each node and user identity is selectively obtained by either table lookup or by way of computation.

4. A method according to claim 2, wherein the cryptographic facility of each node further includes no more than the local and remote variants of each of a plurality of distinguishable cross-domain keys corresponding to the number of nodes with which it can potentially cryptographically communicate.

5. A method according to claim 1, wherein the step of combining the parameter with the interim key to produce the session key includes the step of encrypting the parameter with the interim key.

6. A method for establishing a key commutatively among n cryptographically communicating nodes and for authenticating node and user identities, said key being valid only for the duration of a single cryptographic session, each of the nodes having a local cryptographic facility including a plurality of pre-established cross-domain keys, and a concordance between a plurality of node and user identities and at least one identifier associated therewith, comprising the steps at each node of:

(a) transmitting its node and user identity to the (n−1) other nodes and responsively obtaining the identity of said (n−1) other nodes;

(b) generating a local random number, encrypting it under each of the pre-established cross-domain keys, transmitting each one of the set of encrypted random numbers to each one of the set of counterpart (n−1) other nodes, and decrypting under the counterpart cross-domain keys the encrypted random numbers received from the counterpart nodes;

(c) forming a parameter by combining the identifies derived or associated with the identities of the n nodes and users;

(d) forming an interim key from the composite of the local random and received encrypted random numbers; and (e) combining the parameter with the interim key to produce the session key.

7. A method according to claim 6, wherein each cross-domain key includes a local and remote variant thereof.

8. A method according to claim 6, wherein generated random numbers are encrypted under the local variant corresponding to each cross-domain key while any received encrypted random numbers from counterpart nodes are decrypted under the remote variant of the counterpart cross-domain key.

9. A method according to claim 6, wherein the local and received random numbers which form an interim key are encrypted under the counterpart remote variant.

10. A method according to claim 6, wherein the step of combining the parameter with the interim key to produce the session key includes the step of encrypting the parameter with the interim key.

11. A method according to claim 1 or 6, wherein the step of forming the interim key includes the exclusive OR'ing of the local and received random numbers.

12. A method according to claim 1 or 6, wherein the steps of combining the identifiers to form a parameter or forming a composite of local and received random numbers are commutative steps.

13. A method according to claim 1 or 6, wherein each identifier is a value ascertained as a one-way function of node/user identity or indicia.

14. A method according to claim 1 or 6, wherein there is provided the additional step of checking to verify that the session key so generated is the same at both the sending and receiving nodes.

15. A method as in claim 1 wherein the step of combining the parameter with the interim key to produce the session key includes the step of additively combining the attributes corresponding to the counterpart node and user identities, and then encrypting the additive combination with the interim key.

16. A method as in claim 6 wherein the step of combining the parameter with the interim key to produce the session key includes the step of additively combining the attributes corresponding to the counterpart node and user identities, and then encrypting the additive combination with the interim key.

* * * * *